United States Patent
Wang et al.

(10) Patent No.: US 7,286,198 B2
(45) Date of Patent: Oct. 23, 2007

(54) TRANSFLECTIVE LIQUID CRYSTAL DISPLAY

(75) Inventors: Qiong-Hua Wang, Orlando, FL (US); Shin-Tson Wu, Oviedo, FL (US); Qi Hong, Orlando, FL (US); Yung-Hsun Wu, Yunghe (TW)

(73) Assignee: TPO Displays Corp. (TW)

( * ) Notice: Subject to any disclaimer, the term of this patent is extended or adjusted under 35 U.S.C. 154(b) by 351 days.

(21) Appl. No.: 11/017,677

(22) Filed: Dec. 22, 2004

(65) Prior Publication Data

US 2005/0151902 A1 Jul. 14, 2005

(30) Foreign Application Priority Data

Jan. 8, 2004 (TW) .............................. 93100418 A

(51) Int. Cl.
G02F 1/1335 (2006.01)
G02F 1/1339 (2006.01)
(52) U.S. Cl. .................... 349/114; 349/113; 349/156
(58) Field of Classification Search ............. 349/113, 349/114, 156, 160
See application file for complete search history.

(56) References Cited

U.S. PATENT DOCUMENTS

| 5,956,112 | A | * | 9/1999 | Fujimori et al. ............ 349/156 |
| 6,020,941 | A | | 2/2000 | Ma |
| 2002/0145689 | A1 | * | 10/2002 | Kaneko ...................... 349/114 |

FOREIGN PATENT DOCUMENTS

| JP | 09-304788 | 11/1997 |
| JP | 11-190848 | 7/1999 |
| JP | 2001-281662 | 10/2001 |
| JP | 2003-091006 | 3/2003 |
| JP | 2003066473 | 3/2003 |
| WO | WO 03/093898 | 11/2003 |

* cited by examiner

*Primary Examiner*—Michael H. Caley
(74) *Attorney, Agent, or Firm*—MH2 Technology Law Group

(57) ABSTRACT

A transflective liquid crystal display with a single LC cell gap. Each of a plurality of pixel regions comprises a reflective region and a transmissive region. A liquid crystal cell wall structure between the upper and lower substrates creates a first channel at reflective region and a second channel at transmissive region. A first liquid crystal layer is filled into the first channel of the reflective region. A second liquid crystal layer is filled into the second channel of the transmissive region.

20 Claims, 5 Drawing Sheets

TRANSFLECTIVE LIQUID CRYSTAL DISPLAY

FIELD OF THE INVENTION

The invention generally relates to liquid crystal displays, and more particularly, to transflective liquid crystal displays with a single liquid crystal cell gap comprising separate transmissive (T) and reflective (R) cells.

BACKGROUND OF THE INVENTION

Conventional transmissive type liquid crystal displays (LCD) suffer low image contrast when the ambient environment is bright. That is, the color reproducibility is lower and the display is not sufficiently recognizable because the ambient light is brighter than the display light. Moreover, use of the backlight increases power consumption. Reflective liquid crystal displays comprise a reflector formed on one of a pair of substrates rather than a backlight so that ambient light is reflected from the surface of the reflector. The method is disadvantageous, however, in that the display is less visible when the ambient environment is dark.

In order to overcome the aforementioned problems, a liquid crystal display which realizes both a transmissive mode and a reflective mode in a transflective liquid crystal display device has been disclosed in, for example, U.S. Pat. Nos. 6,281,952 and 6,295,109, the entireties of which are hereby incorporated by reference. Each pixel of the transflective liquid crystal display splits into reflective (R) and transmissive (T) sub-pixels. Usually, the R and T area ratio is 4:1, in favor of reflective display. The transmissive display is used only in dark environments for power conservation.

FIG. 1A is a cross section of a conventional transflective liquid crystal display with a single LC cell gap. FIG. 1B is a cross section of a conventional transflective liquid crystal display with a double cell gap.

In FIG. 1A, a transflective LCD 10 with a single LC cell gap comprises an upper substrate 12 and a lower substrate 14 with a liquid crystal layer 16 interposed therebetween. The lower substrate 14 comprises a plurality of pixel electrode regions. Each pixel electrode region comprises a reflective electrode region 18 and a transmission region 20, separately defining a reflection region (R) and a transmission region (T). The upper substrate 12 comprises a transparent electrode 22 to serve as a common electrode. A first polarizer 26I is disposed on the upper substrate 12 opposing the liquid crystal layer 16. A first quarter wave plate 24I is disposed between the first polarizer 26I and the liquid crystal layer 16. A second polarizer 26II is disposed on the lower substrate 14 opposing the liquid crystal layer 16. A second quarter wave plate 24II is disposed between the second polarizer 26II and the liquid crystal layer 16. A backlight is provided under the lower substrate 14. The cell gaps at the R and T regions are the same, as shown in FIG. 1A. The cell gap is optimized for R region. In FIG. 1B, a transflective LCD 28 with a double LC cell gap is nearly identical to the transflective LCD 10 in FIG. 1A and for simplicity its detailed description is omitted. The transflective LCD 28 differs from the transflective LCD 10 in that the liquid crystal layer 16 of each pixel comprises two different thicknesses, i.e. the cell gaps are $d_1$ and $d_2$ for the R and T sub-pixels, respectively. In this approach, both the R and T sub-pixels have high efficiency. However, the response time of the T mode is four times slower than the response time of the R mode. Moreover, because this approach requires complicated structures and processes, the cell gap accuracy and uniformity can be poor. This can result in deteriorating LCD performance, such as variations in brightness and color.

It is desirable to overcome these and other problems of the prior art and to provide transflective LCDs including T and R regions with similar retardation changes that provide both regions with high light modulation efficiency.

SUMMARY OF THE INVENTION

In various embodiments, there is a transflective LCD with a single LC cell gap using separate R and T cells, in which T and R cells are filled with liquid crystal materials having similar properties except a birefringence change of the R cell is approximately half that of the T cell.

In various other embodiments, a transflective liquid crystal display with an upper substrate and a lower substrate comprises a plurality of pixel regions formed between the upper and the lower substrates. At least one pixel region comprises a reflective region and a transmissive region. A liquid crystal cell wall structure is interposed between the upper and lower substrates, thereby forming a first channel at the reflective region and a second channel at the transmissive region. A first liquid crystal layer is filled into the first channel of the reflective region. A second liquid crystal layer is filled into the second channel of the transmissive region. A birefringence $\Delta n_R$ of the first liquid crystal layer and a birefringence $\Delta n_T$ of the second liquid crystal layer satisfy the relation: $\Delta n_T = (1.5 \sim 2.5)\Delta n_R$.

In still other various embodiments, a transflective liquid crystal display includes a plurality of pixel regions, wherein each of the plurality of pixel regions comprises a reflective region and a transmissive region. The tranflective liquid crystal display further includes a liquid crystal cell wall structure that creates a first channel comprising the reflective regions and a second channel comprising the transmissive regions. A first liquid crystal layer is disposed in the first channel and a second liquid crystal layer is disposed in the second channel. A birefringence $\Delta n_T$ of the second liquid crystal layer is approximately equal to $2\Delta n_R$ of the first liquid crystal layer.

In various embodiments, a method of forming transflective liquid crystal display is provided. The method includes forming a liquid crystal cell wall structure on a lower substrate to create a first channel and a second channel. A plurality of pixel regions can be formed between an upper substrate and the lower substrate, wherein each of the plurality of pixel regions comprises a portion of the first channel and a portion of the second channel. The first channel can be filled with a first liquid crystal material to comprise a reflective region within each of the plurality of pixel regions. The second channel can be filled with a second crystal material to comprise a transmissive region within each of the plurality of pixel regions. The birefringence $\Delta n_R$ of the first liquid crystal material and a birefringence $\Delta n_T$ of the second liquid material can satisfy the relationship $\Delta n_T = (1.5 \sim 2.5)\Delta n_R$.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to exemplary embodiments of the present invention, examples of which are illustrated in the accompanying drawings. Wherever possible, the same reference numbers will be used throughout the drawings to refer to the same or like parts.

Figure 1A:
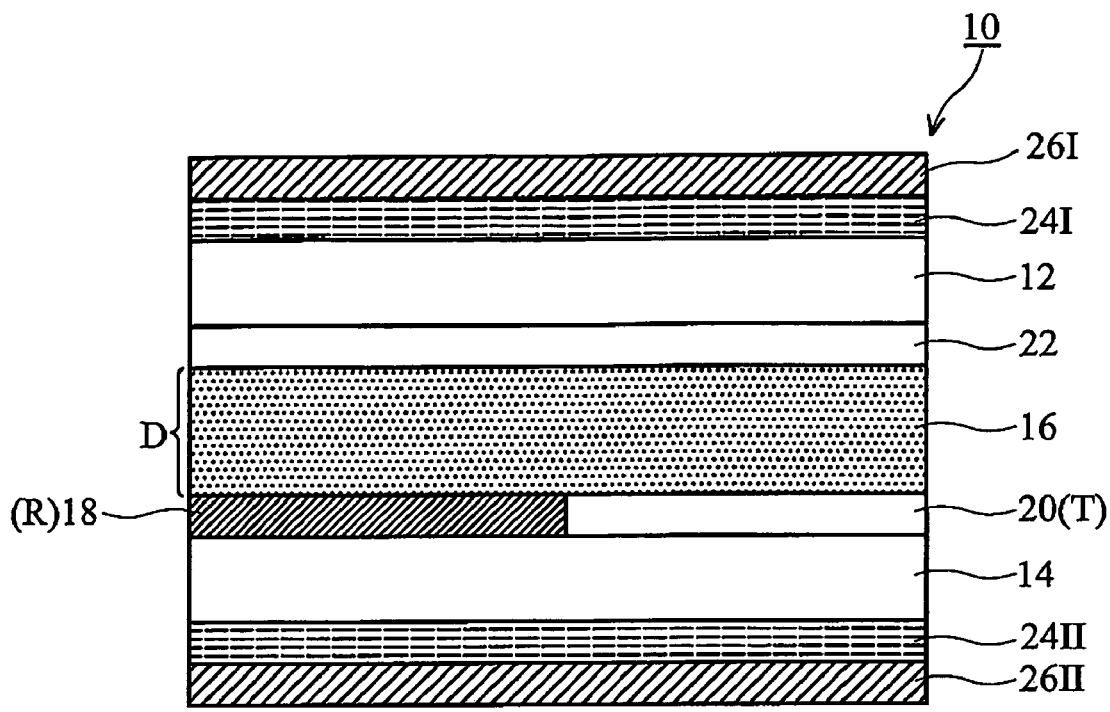
FIG. 1A is a cross sectional view of a conventional transflective liquid crystal display with a single LC cell gap.
Figure 1B:
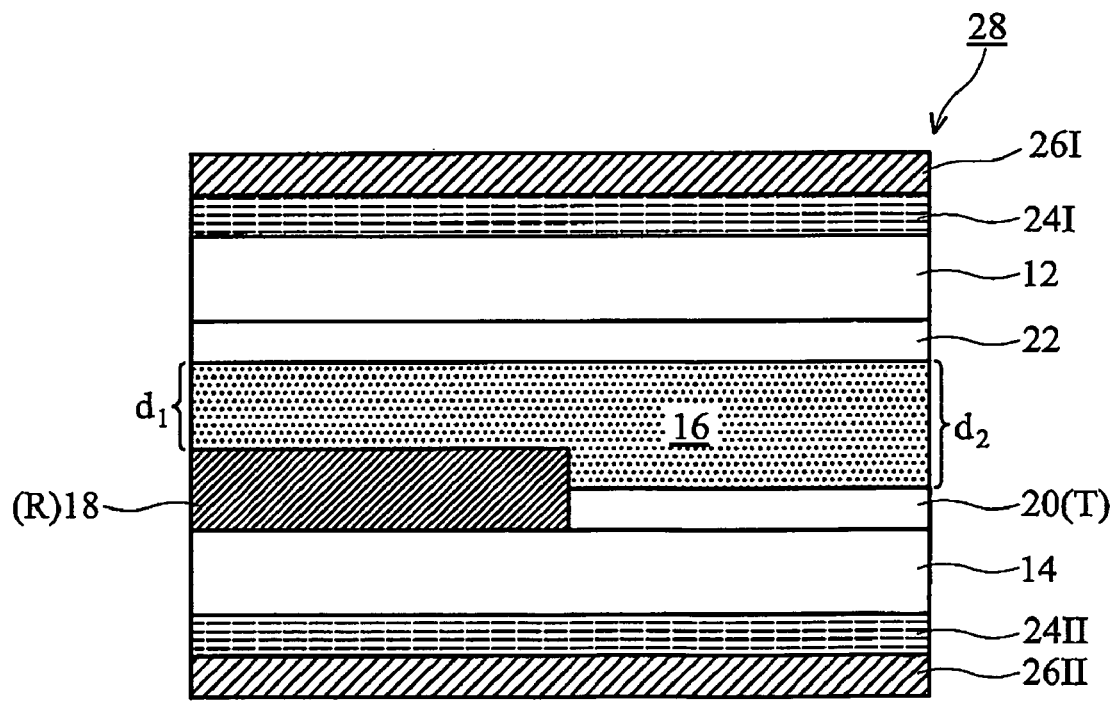
FIG. 1B is a cross sectional view of a conventional transflective liquid crystal display with a double cell gap.
Figure 2A:
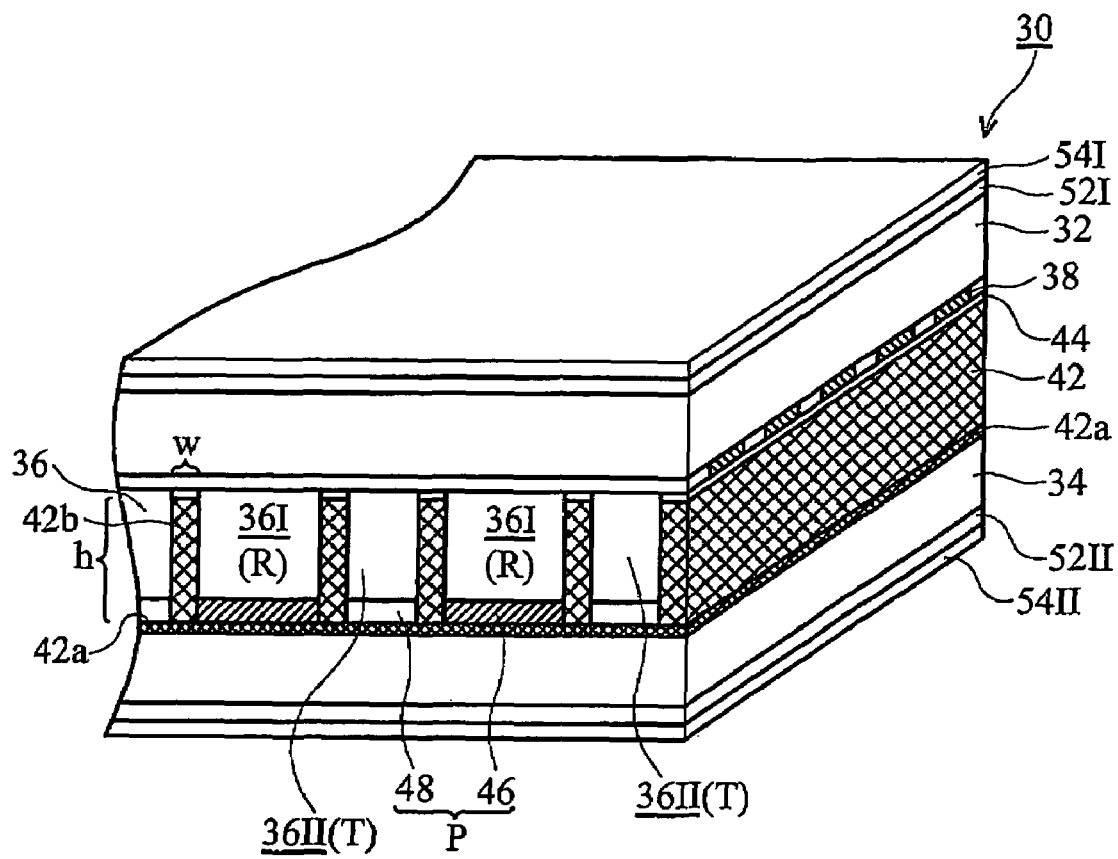
FIG. 2A is a perspective view of a transflective liquid crystal display with a single LC cell gap according to an embodiment of the invention.
Figure 2B:
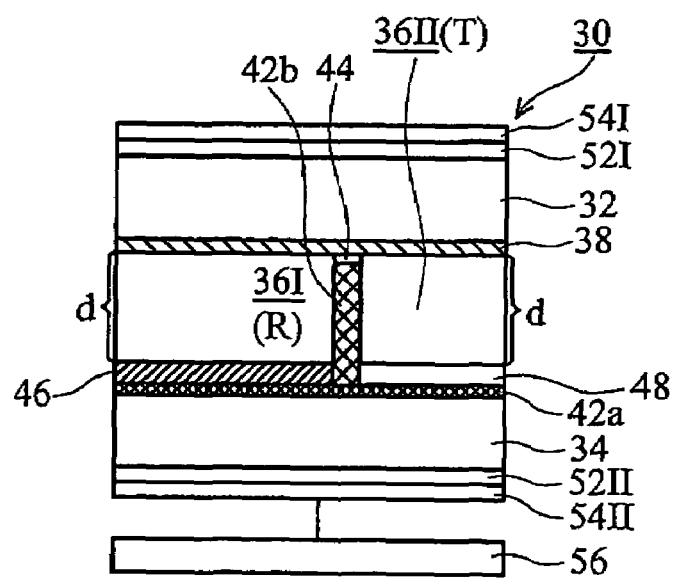
FIG. 2B is a cross sectional view of a transflective liquid crystal display with a single LC cell gap according to an embodiment of the invention.

FIG. 2A is a perspective view of an exemplary transflective liquid crystal display with a single LC cell gap according to an embodiment of the invention. FIG. 2B is a cross sectional view of an exemplary transflective liquid crystal display with a single LC cell gap.

Referring to FIG. 2A, a transflective LCD 30 with a single LC cell gap includes an upper substrate 32 and a lower substrate 34 and a liquid crystal layer 36 interposed therebetween. The upper substrate 32 includes a transparent electrode 38 serving as a common electrode. The lower substrate 34 includes a plurality of pixel regions P and an LC cell wall structure 42. The upper substrate 32 and the lower substrate 34 are jointed by an adhesion layer 44. Each pixel region P includes a reflective region R and a transmission region T. The LC cell wall structure 42 separates all reflective regions R into a first channel and all transmissive regions T into a second channel. A reflective electrode region 46 is formed in each reflective region R, and a transmissive electrode region 48 is formed in each transmissive region T. The liquid crystal layer 36 interposed between upper substrate 32 and lower substrate 34 is divided into a first LC layer 36I and a second LC layer 36II. The first LC layer 36I is disposed in each reflective region R, and the second LC layer 36II is disposed in each transmissive region T. A first polarizer 54I is disposed on upper substrate 32 opposing liquid crystal layer 36. A first quarter wave plate 52I is disposed between first polarizer 54I and liquid crystal layer 36. A second polarizer 54II is disposed on the lower substrate 34 opposing the liquid crystal layer 66. A second quarter wave plate 52II is disposed between the second polarizer 54II and the liquid crystal layer 36. A backlight 56 is provided under the lower substrate 34.

A reflective electrode is defined in the reflective electrode region, and a transmissive electrode is defined in the transmissive electrode region. The reflective electrode comprises a reflective conductor, such as, for example, Al, Al alloy, or Ag. The transmissive electrode comprises a transparent conductor, such as, for example, indium tin oxide (ITO) or indium zinc oxide (IZO).

The LC layer 36 forms a single cell gap in a pixel region P, i.e. the cell gaps at the R and T regions have the same thickness d.

Two liquid crystal materials are filled in two independent regions in a pixel P, i.e. the reflective region R is filled with the first LC material 36I, and the transmissive region T with the second LC material 36II. The first LC material 36I and the second LC material 36II can have approximately the same properties except birefringence changes. The birefringence changes can satisfy the following equation:

$$\Delta n_T=(1.5\sim2.5)\Delta n_R$$

where $\Delta n_T$ is the birefringence change of liquid crystal material in the T region and $\Delta n_R$ is the birefringence change of liquid crystal material in the R region.

Moreover, optical retardation can be expressed by $\delta=\Delta n\times d$, wherein d is cell thickness. Transmission variation can be expressed by $\Delta T \propto \Delta(\Delta n\times d)$, i.e. the change of the transmission is proportional to the change of retardation.

Total retardation change for R is $\delta_R=(\Delta n_R\times d)\times 2$, wherein 2 is for double-path for R, and total retardation change for T is $\delta=\Delta n_T\times d$. Thus, the relationship $\delta_R=\delta_T$ represents T and R experiencing the same retardation change $\Delta T_T=\Delta T_R$.

Figure 3:
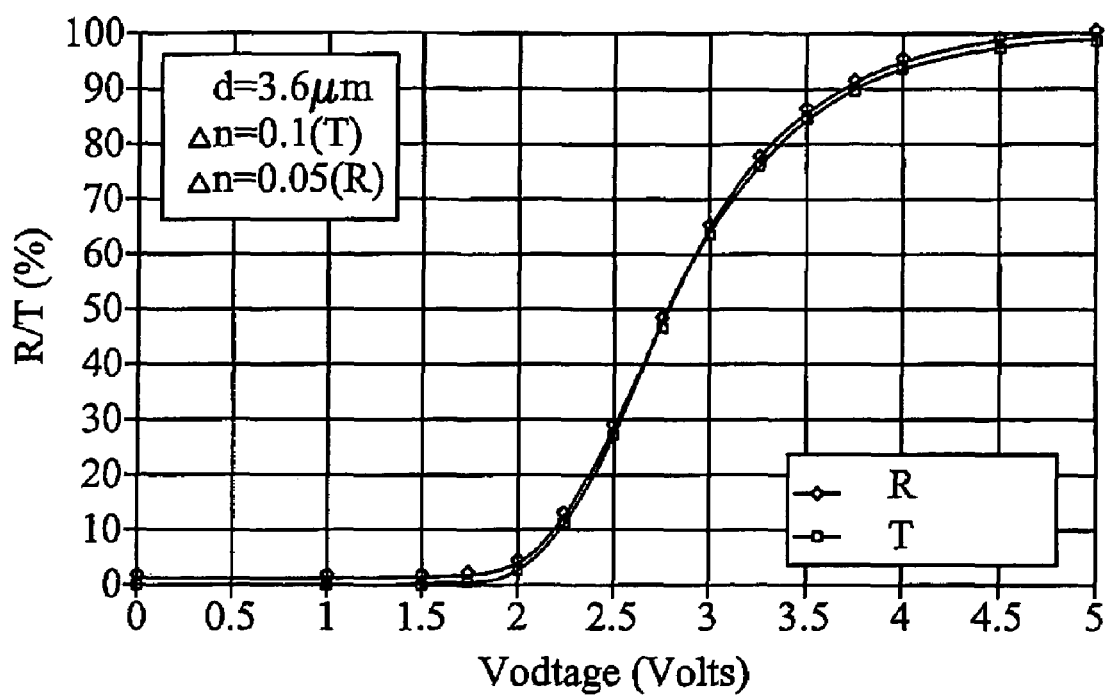
FIG. 3 shows simulation results for the reflection and transmittance when various voltages are applied to the transflective LCD.

Accordingly, T and R have the same light efficiency. FIG. 3 shows the simulation results for the reflectance and transmittance when various voltages are applied to the transflective LCD. Both R and T reach 100% as applied voltage $V_{on}$ exceeds about 5V.

In order for T and R to operate with the same characteristics, the birefringence changes of first LC material 36I and second LC material 36II can satisfy $\Delta n_T=(1.5\sim2.5)\Delta n_R$. In various embodiments, the first LC material 36I and the second LC material 36II can satisfy $\Delta n_T=2\Delta n_R$. In various other embodiments, the birefringence changes can be $\Delta n_T=0.1\sim0.16$ and $\Delta n_R=0.05\sim0.08$. In various other embodiments, the birefringence changes can be $\Delta n_T=0.14$ and $\Delta n_R=0.07$. Other physical properties, such as dielectric constants, splay elastic constants, and rotational viscosities can be the same so that the T and R regions can have the same threshold voltage and response time.

Figure 4:
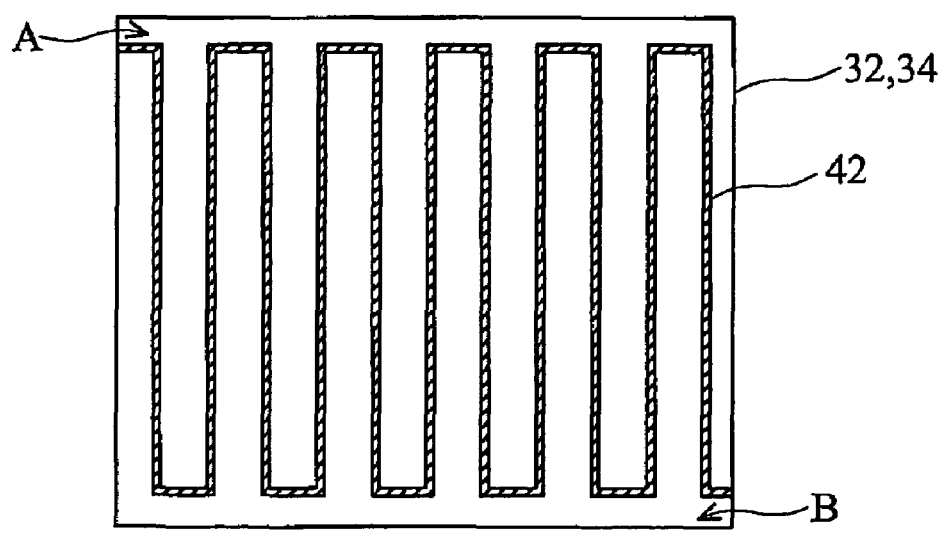
FIG. 4 is a top view of the serpentine LC cell wall structure according to an embodiment of the invention.

Referring to FIG. 4, it shows an exemplary LC cell wall structure 42 having a serpentine pattern, separating T and R cells. More specifically, the serpentine LC cell wall structure 42 can create two isolated channels, thereby connecting the R regions into a first isolated channel and connecting the T regions into a second isolated channel. FIG. 4 is a top view of the serpentine LC cell wall structure 42. The LC cell wall structure 42 can include a first LC fill opening A and a second LC fill opening B disposed on the opposing edges of upper substrate 32 and lower substrate 34. The first isolated channel with all R regions can be filled with the first liquid crystal material 36I using conventional vacuum-filling, one-drop-filling (ODF), or other methods know to one of ordinary skill in the art. Thereafter, the first LC fill opening A can be sealed using, for example, epoxy. The second isolated channel with all T regions can be filled with the second liquid crystal material 36II using conventional vacuum-filling, one-drop-filling (ODF), or other methods known to one of ordinary skill in the art. Thereafter, the second LC fill opening B can be sealed using, for example, epoxy.

The LC cell wall structure 42 can be disposed just under a black matrix (nor shown) so the aperture ratio of the transflective LCD is approximately the same as appears conventionally. Referring to FIG. 2A, the LC cell wall structure 42 includes a bottom 42a and a side wall 42b. The thickness of the bottom 42a can be approximately 500~5000 Å. The height h of the side wall 42h can be approximately 1~5 μm, and the width w of the side wall 42b can be approximately 10~20 μm, i.e. equal to the width of the black matrix. Transflective LCD 30 can be applicable to various reflective LC modes, such as a MTN mode with equivalent λ/4 retardation, for example, a 75° MTN cell at ~15°, or a 80° MTN cell at ~20°, with a single λ/4 plate and two polarizer required; a homogeneous LC cell with λ/4 retardation, with a single λ/4 plate and two polarizer required; and a vertical alignment LC cell with λ/4 retardation, with two λ/4 plates and two polarizer required.

Figure 5A:
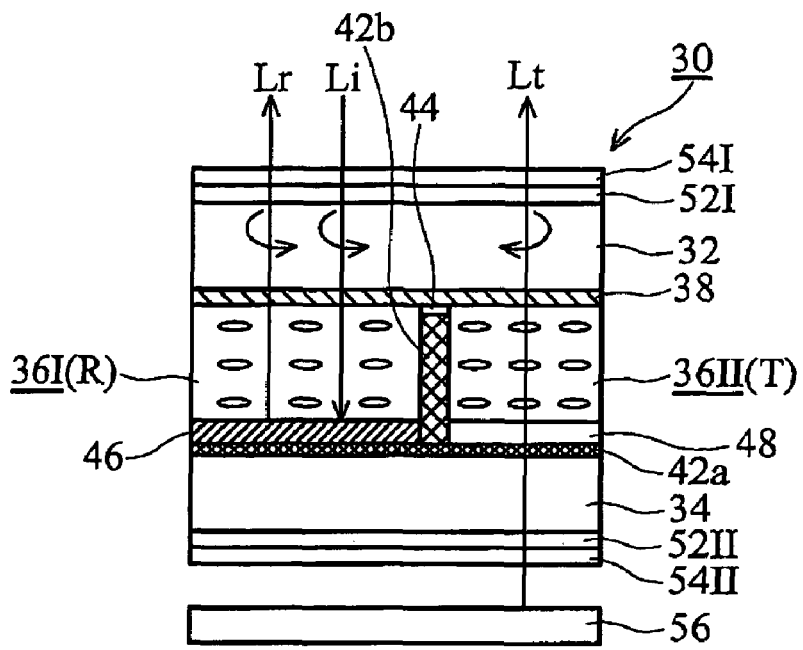
FIG. 5A is the homogeneous LC cell in the "off" state ($\delta_R=\pi/4$, $\delta_T=\pi/2$) illustrating polarization of the back light and ambient light at each stage.
Figure 5B:
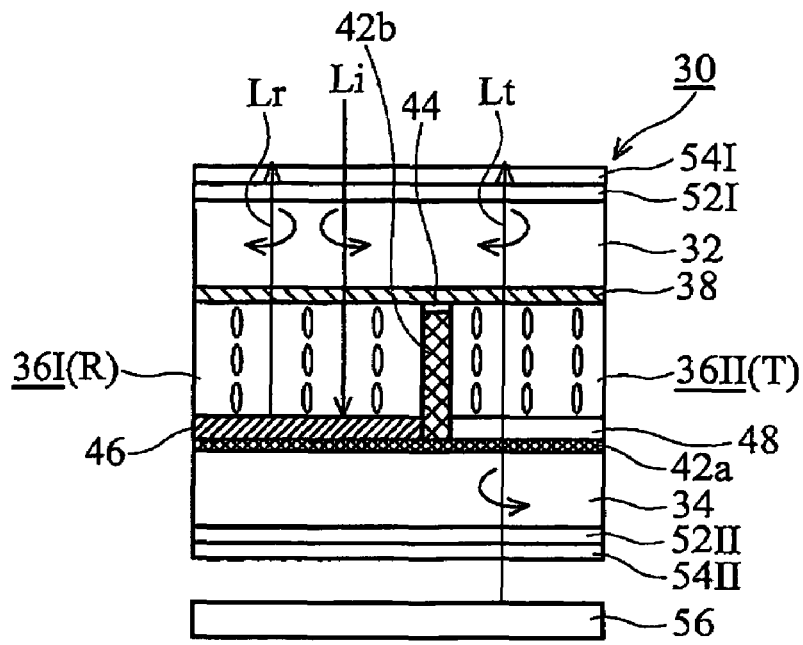
FIG. 5B is the homogeneous LC cell in the "on" state ($\delta_R=0$, $\delta_T=0$) illustrating polarization of the back light and ambient light at each stage.

FIG. 5A depicts an exemplary homogeneous LC cell in the V=0 state, i.e. off state, ($\delta_R=\pi/4$, $\delta_T=\pi/2$) illustrating polarization of the back light and ambient light at each stage. FIG. 5B depicts an exemplary homogeneous LC cell in the "on" state ($\delta_R=0$, $\delta_T=0$) illustrating polarization of the back light and ambient light at each stage, wherein $L_i$ represents incident light of ambient light, $L_r$ represents reflection light of ambient light, $L_t$ represents transmission light of the back light, and the half-circle symbols represent circular polarization.

Figure 6A:
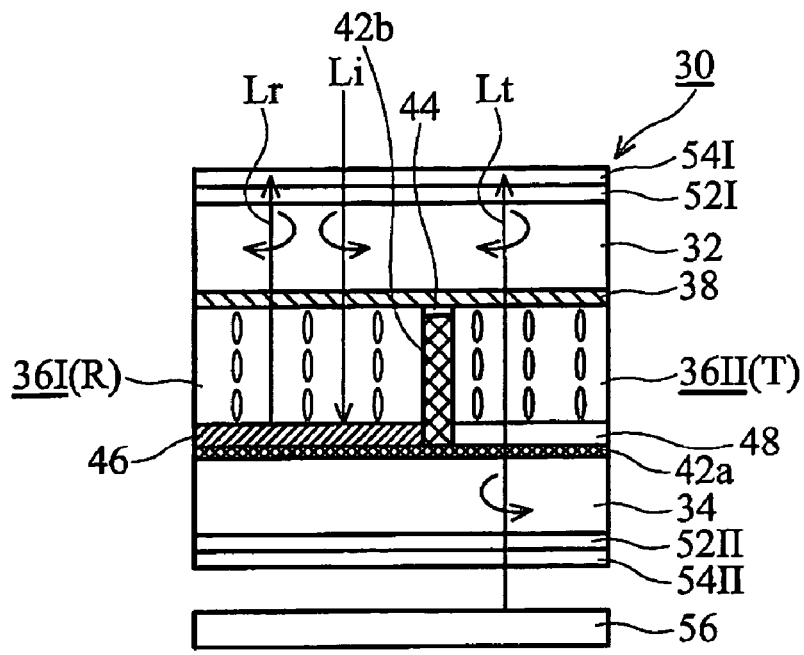
FIG. 6A is the vertical alignment LC cell in the "off" state ($\delta_R=0$, $\delta_T=0$)
Figure 6B:
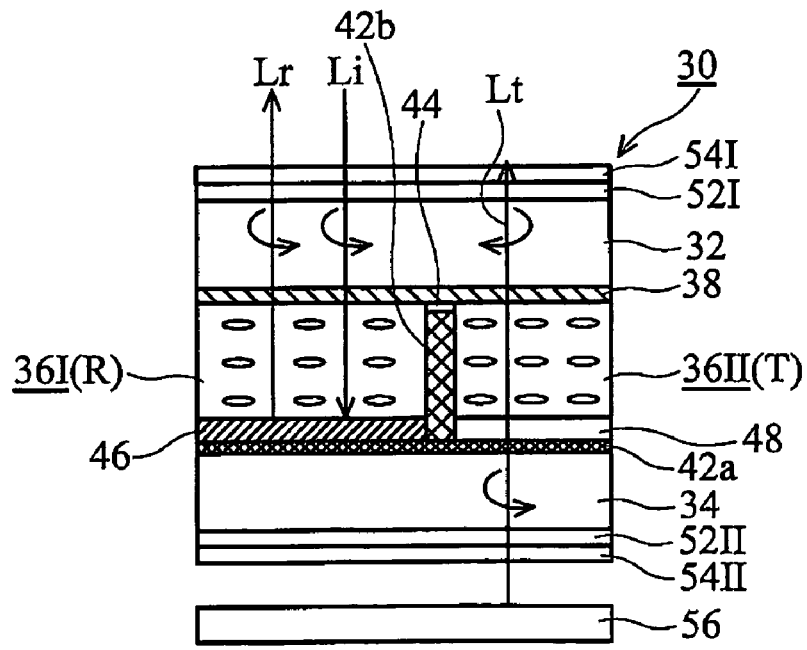
FIG. 6B is the vertical alignment LC cell in the "on" state ($\delta_R=\pi/4$, $\delta_T=\pi/2$) illustrating polarization of the back light and ambient light at each stage.

FIG. 6A depicts an exemplary homeotropic LC cell in the "off" state ($\delta_R=0$, $\delta_T=0$) The LC directors are perpendicular to the glass substrate. Both the back light and ambient light are blocked by the crossed polarizer. FIG. 6B depicts the homeotropic LC cell in the "on" state ($\delta_R=\pi/4$, $\delta_T=\pi/2$) illustrating polarization of the back light and ambient light at each stage. The transmissive region remains unaffected because of no electrode. The reflective region, however, is activated. The effective phase retardation is $\delta=\pi/4$ so that the light leaks through the crossed polarizer. Wherein $L_i$ represents incident light of ambient light, $L_r$ represents reflection light of ambient light, $L_t$ represents transmission light of the back light, and the half-circle symbols represent circular polarization.

Fabrication of exemplary transflective LCDs can be compatible with conventional manufacture techniques. An extra step is to be built a wall on the substrate, but no spacer is required since the wall also act as spacer. A high performance and low cost transflective LCD is thus obtained.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A transflective liquid crystal display comprising:
an upper substrate and a lower substrate;
a plurality of pixel regions between the upper substrate and the lower substrate, at least one of the plurality of pixel regions comprising a reflective region and a transmissive region;
a serpentine liquid crystal cell wall structure disposed between the upper substrate and the lower substrate, creating a continuous first channel connecting each of the reflective region and a continuous second channel connecting each of the transmissive region;
a first liquid crystal layer in the continuous first channel of the reflective region; and
a second liquid crystal layer in the continuous second channel of the transmissive region, a birefringence $\Delta n_R$ of the first liquid crystal layer and a birefringence $\Delta n_T$ of the second liquid crystal layer satisfying $\Delta n_T = (1.5~2.5)\Delta n_R$.

2. The display as claimed in claim 1, wherein a thickness of the first liquid crystal layer is equal to a thickness of the second liquid crystal layer.

3. The display as claimed in claim 1, wherein a dielectric constant, a splay elastic constant, and a rotational constant of the first liquid crystal layer are approximately equal to a dielectric constant, a splay elastic constant, and a rotational constant of the second liquid crystal layer.

4. The display as claimed in claim 1, wherein the liquid crystal cell wall structure comprises a serpentine pattern, the cell wall comprising:
a first liquid entrance disposed on a first end between the upper substrate and the lower substrate to fill the first liquid crystal layer of the reflective region via the first liquid entrance; and
a second liquid entrance disposed on a second end between the upper substrate and the lower substrate to fill the first liquid crystal layer of the reflective region via the second liquid entrance.

5. The display as claimed in claim 1, wherein the liquid crystal cell wall structure comprises a bottom structure and a side wall structure connected with each other, wherein a height of the side wall structure is approximately 1~5 μm and a width of the side wall structure is approximately 10~20 μm.

6. The display as claimed in claim 1, wherein the lower substrate comprises:
a plurality of reflective electrodes formed on the plurality of reflective regions; and
a plurality of transmissive electrodes formed on the plurality of transmissive regions.

7. The display as claimed in claim 1, further comprising:
a first polarizer disposed on the upper substrate opposing the liquid crystal layer;
a second polarizer disposed on the lower substrate opposing the liquid crystal layer;
a first phase compensation film between the liquid crystal layer and the first polarizer; and
a second phase compensation film between the liquid crystal layer and the second polarizer.

8. The display as claimed in claim 7, wherein the first and the second phase compensate films are ¼ wavelength films.

9. A transflective liquid crystal display comprising:
a plurality of pixel regions, each of the plurality of pixel regions comprising a reflective region and a transmissive region;

a serpentine liquid crystal cell wall structure, creating a continuous first channel covering all the reflective regions and a continuous second channel covering all the transmissive regions;

a first liquid crystal layer in the continuous first channel; and a second liquid crystal layer in the continuous second channel, a birefringence $\Delta n_T$ of the second liquid crystal layer being approximately equal to $2\Delta n_R$ of the first liquid crystal layer.

10. The display as claimed in claim 9, wherein a thickness of the first liquid crystal layer is equal to a thickness of the second liquid crystal layer.

11. The display as claimed in claim 9, wherein at least one of a dielectric constant, a splay elastic constant, and a rotational constant is approximately equal for the first liquid crystal layer and the second liquid crystal layer.

12. The display as claimed in claim 9, further comprising:
an upper substrate;
a lower substrate;
a first polarizer disposed on the upper substrate opposing the liquid crystal layer;
a second polarizer disposed on the lower substrate opposing the liquid crystal layer;
a first phase compensation film disposed between the liquid crystal layer and the first polarizer; and
a second phase compensation film disposed between the liquid crystal layer and the second polarizer.

13. The display as claimed in claim 12, wherein the first and the second phase compensate films are ¼ wavelength films.

14. The display as claimed in claim 9, wherein $\Delta n_T$ is about 0.1 to about 0.16 and $\Delta n_R$ is about 0.05 to about 0.08.

15. The display as claimed in claim 9, wherein $\Delta n_T$=0.14 and $\Delta n_R$=0.07.

16. A method of forming a transflective liquid crystal display comprising:

forming a serpentine liquid crystal cell wall structure on a lower substrate to create a continuous first channel and a continuous second channel;

forming a plurality of pixel regions between an upper substrate and the lower substrate, each of the plurality of pixel regions comprising a portion of the continuous first channel and a portion of the continuous second channel;

filling the continuous first channel with a first liquid crystal material to cover a reflective region within each of the plurality of pixel regions; and filling the continuous second channel with a second crystal material to cover a transmissive region within each of the plurality of pixel regions, a relationship between a birefringence $\Delta nR$ of the first liquid crystal material and a birefringence $\Delta nT$ of the second liquid material being $\Delta nT=(1.5~2.5)\Delta nR$.

17. The method of claim 16, wherein the step of forming a liquid crystal cell wall structure comprises forming a serpentine shaped liquid crystal cell wall structure that can isolate the first channel from the second channel.

18. The method of claim 16, wherein the step of forming a liquid crystal cell wall structure further comprises forming a bottom and a side wall.

19. The method of claim 18, wherein a thickness of the bottom is about 500~5000 Å.

20. The method of claim 18, wherein a height of the side wall is about 1~5 μm, and a width of the side wall is about 10~20 μm.

* * * * *